United States Patent
Lundquist (12)

(10) Patent No.: US 12,553,709 B2
(45) Date of Patent: Feb. 17, 2026

(54) LASER IMAGING

(71) Applicant: Arete Associates, Northridge, CA (US)

(72) Inventor: Paul Bryan Lundquist, Longmont, CO (US)

(73) Assignee: Arete Associates, Northridge, CA (US)

( * ) Notice: Subject to any disclaimer, the term of this patent is extended or adjusted under 35 U.S.C. 154(b) by 1233 days.

(21) Appl. No.: 16/253,114

(22) Filed: Jan. 21, 2019

(65) Prior Publication Data

US 2019/0226834 A1    Jul. 25, 2019

Related U.S. Application Data

(60) Provisional application No. 62/620,251, filed on Jan. 22, 2018.

(51) Int. Cl.

| | |
|---|---|
| *G01B 11/25* | (2006.01) |
| *B63G 8/00* | (2006.01) |
| *B63G 8/38* | (2006.01) |
| *F17D 5/06* | (2006.01) |
| *G01F 1/7086* | (2022.01) |
| *G01F 1/74* | (2006.01) |
| *G01M 3/38* | (2006.01) |

(Continued)

(52) U.S. Cl.
CPC .............. *G01B 11/25* (2013.01); *B63G 8/001* (2013.01); *B63G 8/38* (2013.01); *F17D 5/06* (2013.01); *G01F 1/7086* (2013.01); *G01F 1/74* (2013.01); *G01M 3/38* (2013.01); *G01N 21/49* (2013.01); *G01N 21/6402* (2013.01); *B63G 2008/002* (2013.01); *G01N 21/6456* (2013.01)

(58) Field of Classification Search
None
See application file for complete search history.

(56) References Cited

U.S. PATENT DOCUMENTS

| | | | |
|---|---|---|---|
| 4,914,460 A | * | 4/1990 | Caimi .................. G01S 17/875 348/136 |
| 5,870,191 A | | 2/1999 | Shirley et al. |
| 5,892,575 A | | 4/1999 | Marino |

(Continued)

FOREIGN PATENT DOCUMENTS

| | | |
|---|---|---|
| FR | 3040848 A | 3/2017 |
| FR | 3040848 A1 | 3/2017 |

(Continued)

OTHER PUBLICATIONS

Rene Carmona, Frederic Cerou and Benjamin Blasco, Lidar Imaging Through the Ocean Surface, Jun. 30, 2000.

(Continued)

*Primary Examiner* — Shelby A Turner
*Assistant Examiner* — Brandon J Becker
(74) *Attorney, Agent, or Firm* — FisherBroyles, LLP; Gregory T. Fettig

(57) ABSTRACT

In one embodiment, an imaging system includes a laser operable to diverge laser light to a surface. An imaging element is configured in a bistatic arrangement with respect to the laser and is operable to image laser light returns from the surface. A detector is in optical communication with the imaging element to generate one or more digital images of the laser light returns. And, a processor generates mapping data of the surface from the one or more digital images.

19 Claims, 12 Drawing Sheets

(51) Int. Cl.
*G01N 21/49* (2006.01)
*G01N 21/64* (2006.01)

(56) References Cited

U.S. PATENT DOCUMENTS

| | | | |
|---|---|---|---|
| 6,836,285 B1* | 12/2004 | Lubard | G01S 7/487 |
| | | | 348/81 |
| 7,274,448 B2 | 9/2007 | Babin et al. | |
| 7,440,084 B2* | 10/2008 | Kane | G02B 6/4204 |
| | | | 356/5.01 |
| 7,796,809 B1 | 9/2010 | Carder et al. | |
| 8,159,680 B2 | 4/2012 | Robinson et al. | |
| 8,212,995 B2 | 7/2012 | Koehler et al. | |
| 8,427,649 B2* | 4/2013 | Hays | G01S 17/58 |
| | | | 356/450 |
| 8,542,413 B2 | 9/2013 | Gillham et al. | |
| 8,917,395 B2* | 12/2014 | Dalgleish | G01N 21/47 |
| | | | 356/445 |
| 9,255,790 B2* | 2/2016 | Zhu | G01B 11/24 |
| 10,088,571 B2 | 10/2018 | Vuorenkoski-Dalgleish et al. | |
| 2008/0304081 A1* | 12/2008 | Debevec | G01B 11/25 |
| | | | 356/612 |
| 2009/0257118 A1* | 10/2009 | Heritier | G02B 27/0983 |
| | | | 359/399 |
| 2010/0157253 A1* | 6/2010 | De Vaan | H04N 9/3129 |
| | | | 353/69 |
| 2016/0214693 A1* | 7/2016 | Habeger | B63C 11/52 |
| 2016/0274024 A1* | 9/2016 | Han | G01N 29/2425 |
| 2018/0275038 A1* | 9/2018 | Cantin | G01N 15/06 |

FOREIGN PATENT DOCUMENTS

| | | |
|---|---|---|
| JP | 2002005616 A * | 1/2002 |
| WO | 2017098223 A1 | 6/2017 |

OTHER PUBLICATIONS

F. R. Dalgleish, F. M. Caimi, A. K. Vuorenkoski, W. B. Britton and B. Ramos, Experiments in bistatic aser Line Scan (LLS) underwater imaging, Jan. 1, 2009.

Walid Gomaa, Ashraf F. El-Sherif, Yasser H. El-Sharkawy, Underwater laser detection system, Jan. 1, 2015.

Lv Pei, He Junhua, Zhou Renkui, Liu Haiy, The application of underwater optics and its development, Jan. 1, 2007.

* cited by examiner

LASER IMAGING

CROSS REFERENCE TO RELATED APPLICATIONS

This patent application claims priority to, and thus the benefit of an earlier filing date from, U.S. Provisional Patent Application No. 62/620,251 (filed Jan. 22, 2018), the contents of which are hereby incorporated by reference.

BACKGROUND

Laser imaging systems and lidar systems can be configured in either monostatic or bistatic arrangements. Monostatic arrangements share the same aperture for transmitting and receiving. Bistatic arrangements use separate apertures for the laser and the receiver. In either arrangement, the focusing optics for the receiver are typically configured so that near range emissions do not come to focus, or so that light backscattered from only a limited span of ranges come to focus at the receiver. Additionally, in either arrangement, backscattered light received from near ranges at the receiver can overpower less intense, far-range emissions.

SUMMARY

Systems and methods herein provide for imaging objects with a laser, such as a continuous wave (CW) laser. In one embodiment, an imaging system includes a laser that is operable to diverge laser light to a surface. An imaging element is configured in a bistatic arrangement with respect to the laser. And, the imaging element is operable to image the laser light returned from the surface. The imaging system may include a detector in optical communication with the imaging element to generate one or more digital images of the returned laser light. A processor generates mapping data of the surface from the digital image(s).

The various embodiments disclosed herein may be implemented in a variety of ways as a matter of design choice. For example, some embodiments herein are implemented in hardware, whereas other embodiments may include processes that are operable to implement and/or operate the hardware. Other exemplary embodiments, including hardware, software, firmware, and various combinations thereof are described below.

BRIEF DESCRIPTION OF THE FIGURES

Some embodiments are now described, by way of example only, and with reference to the accompanying drawings. The same reference number represents the same element or the same type of element on all drawings.

DESCRIPTION OF THE FIGURES

Figure 1:
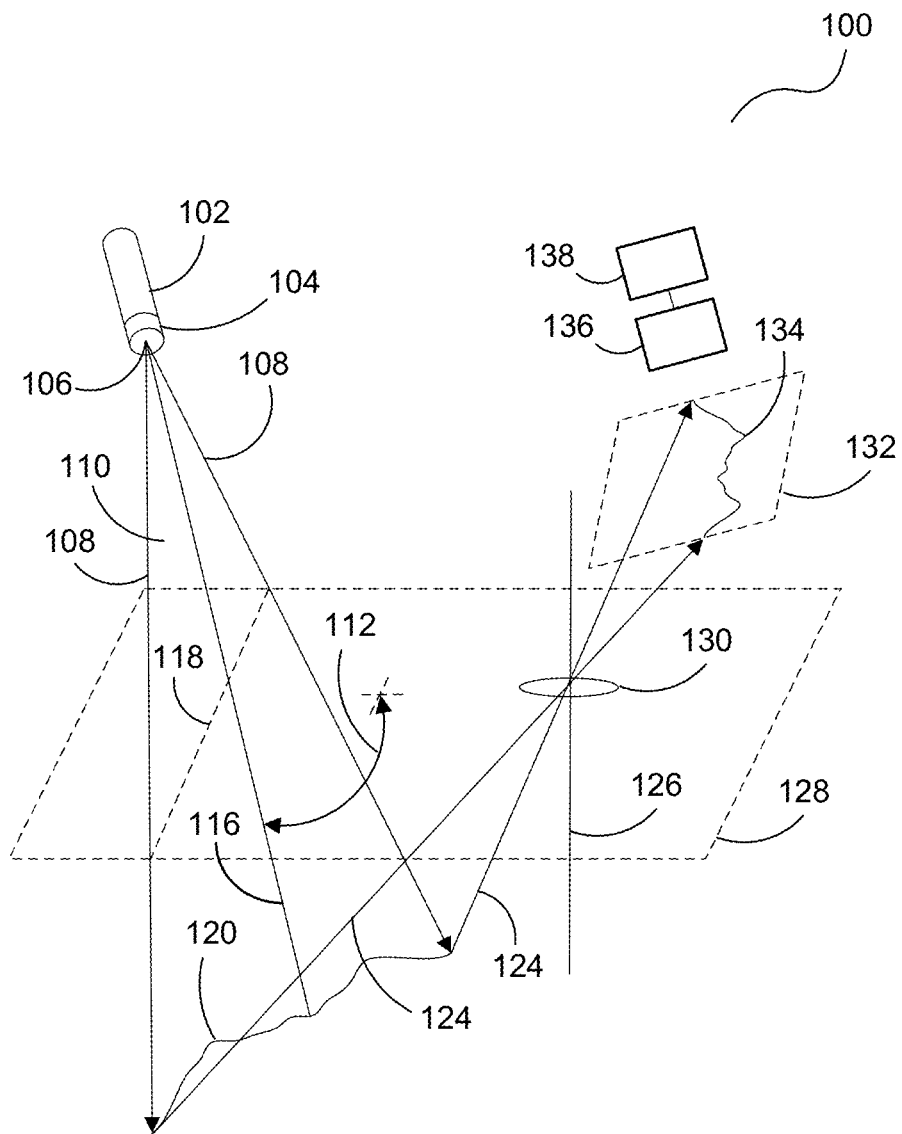
FIG. 1 is a block diagram of an exemplary imaging system.

The figures and the following description illustrate various exemplary embodiments. It will thus be appreciated that those skilled in the art will be able to devise various arrangements that, although not explicitly described or shown herein, embody various principles of design and/or operation and are included within the scope of the embodiments. Furthermore, any examples described herein are intended to aid in understanding the principles of the embodiments and are to be construed as being without limitation to such specifically recited examples and conditions.

Generally, with respect to the embodiments herein, an imaging system includes a laser that may be operable to diverge, or "fan", laser light to a surface, to an object, and/or to/through a volume of distributed scatterers (collectively "surface"). An imaging element may be configured in a bistatic arrangement with respect to the laser. As used herein, a bistatic arrangement generally refers to an optical configuration that employs separate apertures for the laser and a receiver (e.g., the imaging element).

The imaging element is operable to image laser light returns from the surface and/or from a volumetric scatterer distribution. A detector (e.g., a camera) may be in optical communication with the imaging element to generate two-dimensional (2D) digital images of the laser light returns. And, a processor may generate mapping data of the surface (e.g., a digital elevation map of the scene) from the digital images. Alternatively or additionally, the mapping data can be used to determine material types of the surface, to generate a three-dimensional (3D) image of a densitive distribution of volumetric scatterers, to determine color and/or contrast of the surface, etc.

For example, an interrogating laser may generate laser light. The laser may be a continuous wave (CW) laser. Alternatively or additionally, as a matter of design choice, the laser may be designed to pulse laser light (e.g., at pulse durations longer than 1 ms). The laser light may be "fanned" or diverged from the laser substantially in a plane towards the surface using a beam diverging optical element. Alternatively, the beam may be fanned out as a plurality of "beamlets", e.g., by using multiple lasers, by using one or more optical elements that split the beam into multiple beams, by using a diffractive optical element, and/or by using a rotational scanner.

An imaging element may image light returns from the surface onto a detector. Generally, the focal plane of the imaging element (e.g., an imaging plane) is at a non-orthogonal angle with respect to a plane in which the optical axis of the laser lies. As used herein, the term "imaging plane" generally refers to a principal place of the imaging lens or imaging lens system, as opposed to an "image plane" which generally refers to a focal plane of a detector. An optical axis of the laser is generally an imaginary line that defines a path along which light propagates from the laser. And, a detector plane where an image is captured is generally different than the imaging plane where the imaging element is configured. For example, the detector plane may also intersect the imaging plane at a non-orthogonal angle, albeit a different non-orthogonal angle with respect to the non-orthogonal angle between the imaging plane and the plane in which the optical axis of the laser lies.

When the laser light reaches the surface, the light backscatters from the surface as laser light returns. These backscatter emissions may result from any number of processes (e.g., Mie scattering, Raleigh scattering, nonlinear scattering, parametric processes, Raman scattering, fluorescence, laser induced breakdown, etc.). The backscatter emissions (i.e., the laser light returns) are collected by the imaging element and imaged onto the detector plane where the laser light returns are captured by the detector.

When the imaging system is configured with a mobile platform, the detector may capture a plurality of 2D images as the mobile platform moves. The 2-D images may be assembled into data for illustrating range variations in the surface and/or distributions of volumetric scatterers. For example, as the laser, imaging element, and detector move with the mobile platform, a processor may process the 2D images captured by the detector and determine distance variations to the surface to generate mapping information of the surface.

The terms backscattered laser light, backscattered emissions, returned laser light, laser light returns, and the like generally refer to laser light that is backscattered from a surface when laser light from a laser impinges the surface. These terms may be used herein interchangeably.

Figure 2:
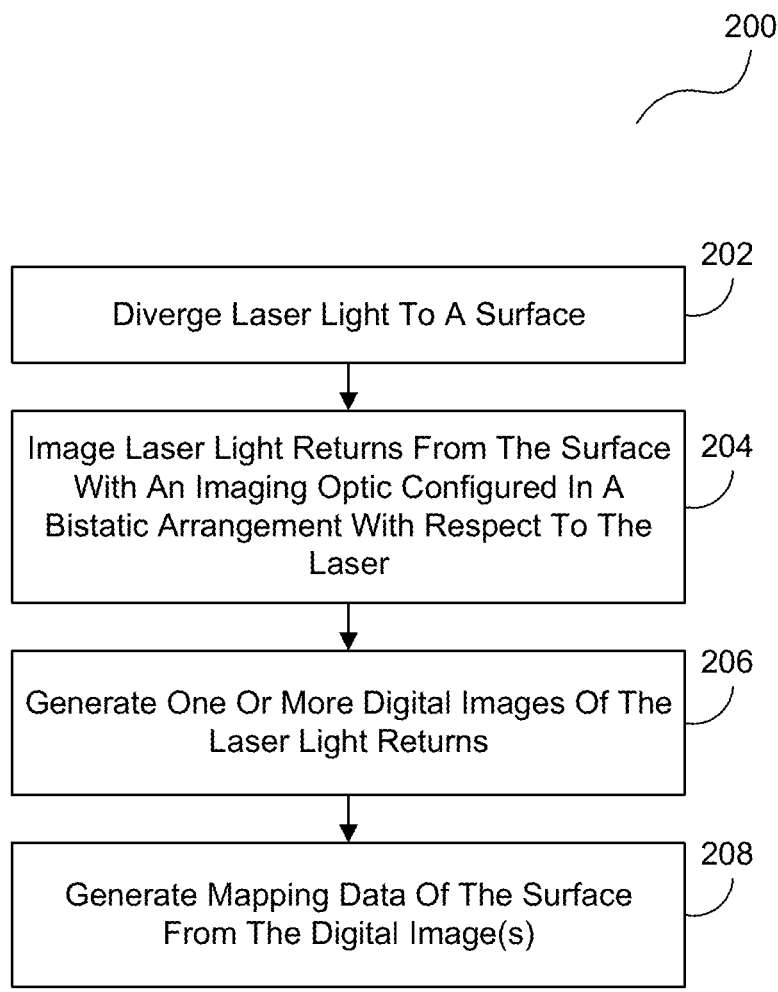
FIG. 2 is a flowchart of an exemplary process for the imaging system of FIG. 1.
Figure 7:
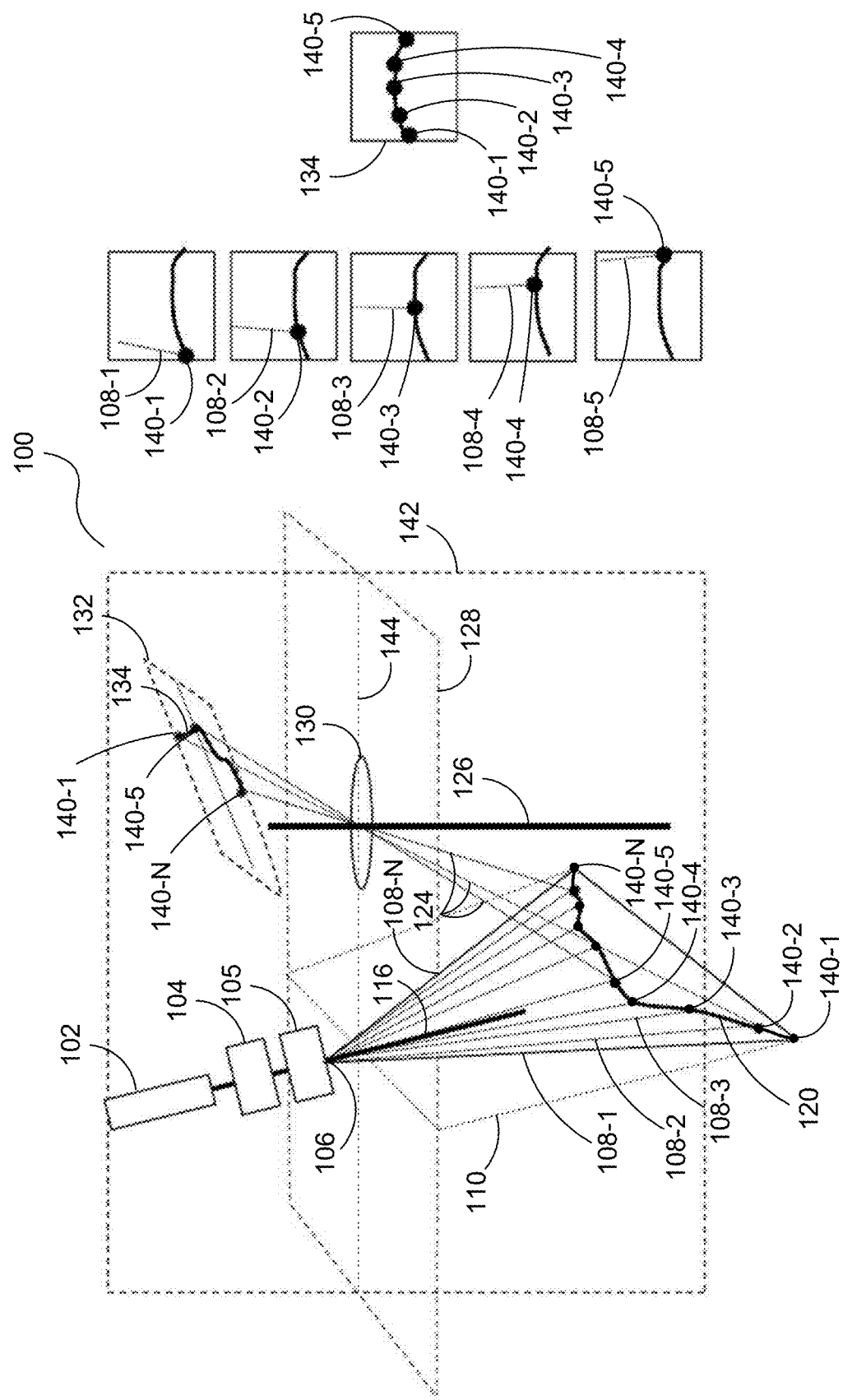
Figure 8:
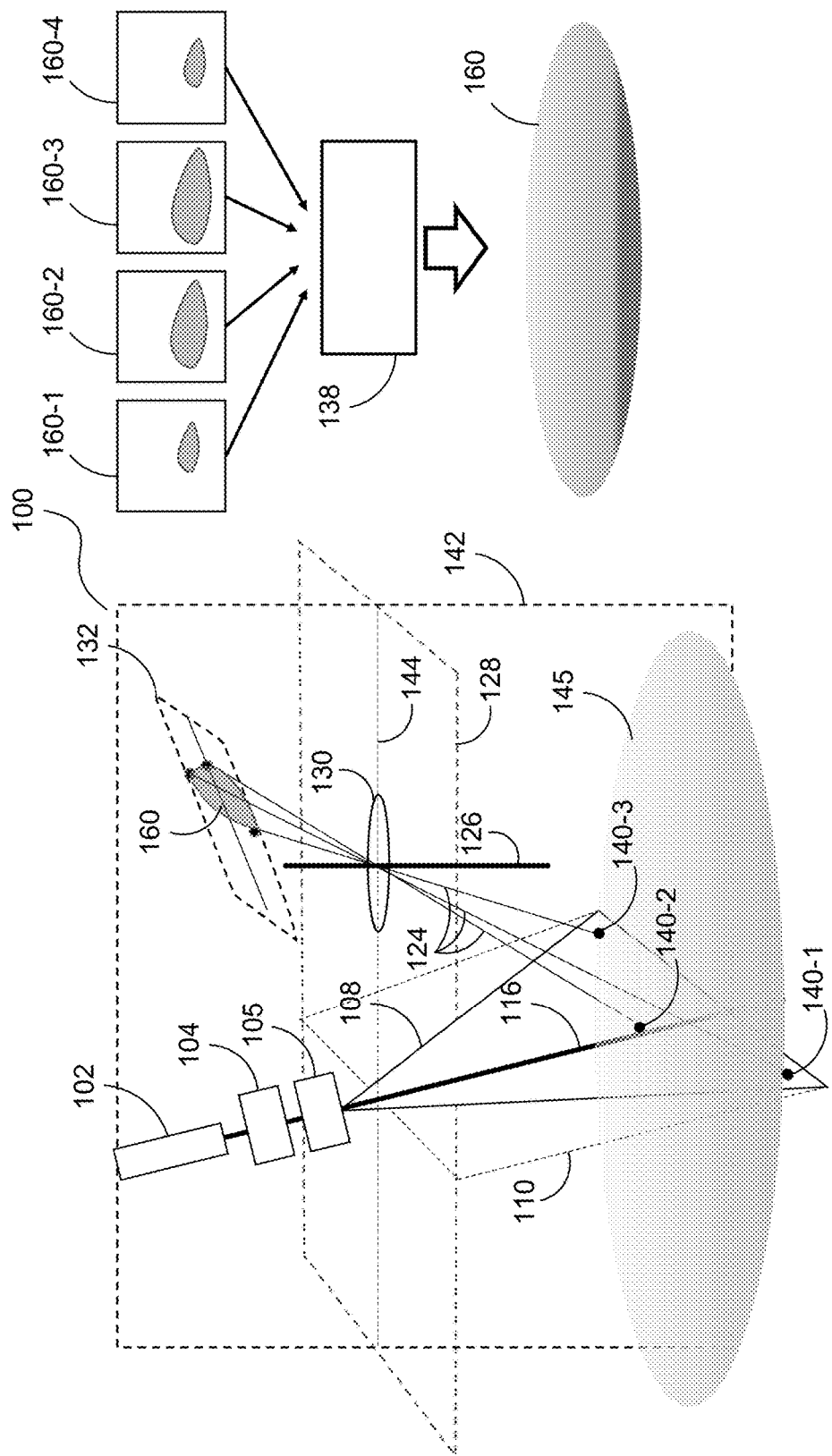
Figure 9:
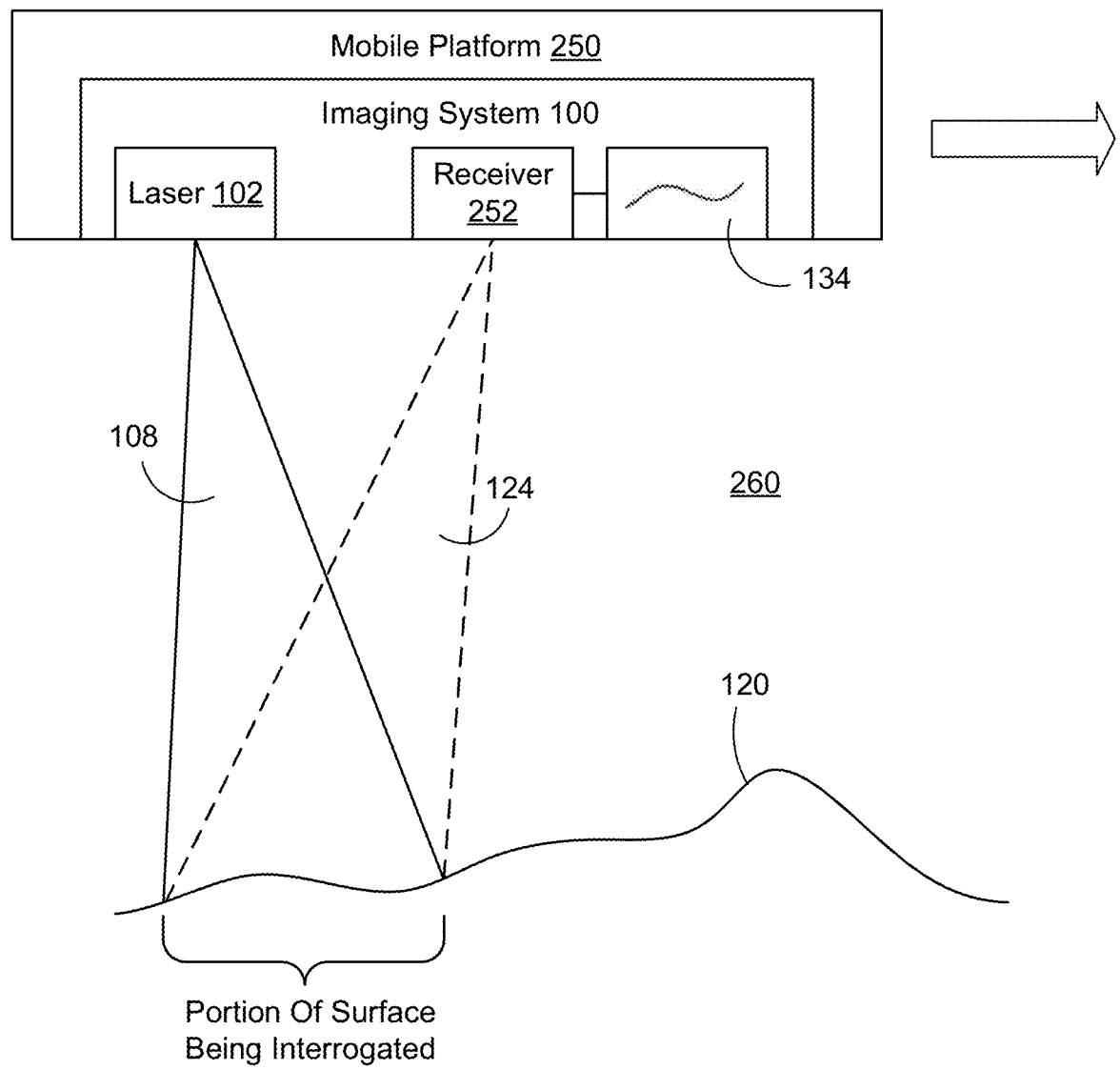
FIG. 9 is a block diagram of an exemplary imaging system configured with a mobile platform.

The following will provide, with reference to FIGS. 1-9, detailed descriptions of systems and methods for laser imaging a surface to generate mapping information of the surface. First, a description of an exemplary laser imaging system is presented in reference to FIG. 1. FIG. 2 is a flowchart of an exemplary process of the laser imaging system of FIG. 1. FIGS. 3-8 illustrate various embodiments of a laser imaging system. And, FIG. 9 illustrates one exemplary processing system that may be used to implement at least a portion of the laser imaging system of FIG. 1.

Turning now to FIG. 1, an imaging system 100 that uses a laser 102 is presented. The laser 102 emits laser light 108 to a surface 120. In some embodiments, the laser light 108 is CW laser light, however, pulsed laser light may be used in some embodiments. One or more optical elements 104 may "fan" the laser light to the surface 120 substantially in a plane 110. For example, the laser 102 may have an optical axis 116 lying in a plane 110. The optical element 104 may diverge the laser light 108 in the plane 110 in which the optical axis 116 of the laser 102 lies. Generally, the plane 110 intersects an imaging plane 128 (where an imaging element 130 lies) through an intersection line 118 in the imaging plane 128 at a non-orthogonal angle 112.

The optical element 104 may diverge the laser light 108 in a variety of ways as a matter of design choice. For example, the optical element 104 may evenly distribute the CW laser light 108 in a fan-like pattern originating from a focal point 106 of the optical element 104 to the surface 120. In some embodiments, the optical element 104 may include slit aperture optic that propagates the diverged laser light in the plane 110. For example, a relatively thin slit may be configured with the optical element 104 that, when the laser light 108 propagates therethrough, the laser light 108 remains substantially in the plane 110.

Alternatively, the optical element 104 may function as a beam splitter that splits a beam of laser light 108 from the laser 102 into a plurality of beamlets in the plane 110 for propagation to the surface 120. Such an embodiment may also include one or more slit apertures that are operable to constrain the laser light 108 within the plane 110. In yet another alternative, the laser 102 may represent a plurality of lasers with each being configured in such a way as to form an individual beam, with each beam diverging at an acute angle from the focal point 106 (or via an optical axis of each laser projected thereto) in the plane 110 with respect to a next closest beam.

When the laser light 108 impinges the surface 120, the light backscatters (e.g., via Mie scattering, Raleigh scattering, nonlinear scattering, parametric processes, Raman scattering, fluorescence, laser induced breakdown, and/or any other backscattering processes). The imaging element 130 images at least a portion of the backscattered light (e.g., laser returns 124) onto a detector plane 132 such that it may be captured by a detector 136.

The imaging element 130 is configured in a bistatic arrangement with respect to the laser 102 with the receiver portion of the imaging system 100 (e.g., the imaging element 130 and the detector 136) having a different aperture than the transmitter portion of the imaging system (e.g., the laser 102). More specifically, the imaging element 130 (e.g., a lens or lens system) is configured in the imaging plane 128 and has an optical axis 126 that is generally orthogonal to the imaging plane 128. Thus, the optical axis 126 lies in a plane that is generally orthogonal to the imaging plane 128 (e.g., as illustrated below in plane 142 of FIG. 3) and the imaging plane may be a principal plane of the imaging element.

The detector 136 is in optical communication with the imaging element 130 and is operable to generate a digital image 134 of the laser light returns 124. A processor 138 forms a representation of the surface 120 that the laser light 108 impinges based on the captured image. When configured with a mobile platform, the imaging system 100 may move along the surface 120 such that the detector 136 can generate a plurality of digital images 134 of the surface 120. Then, the processor 138 may generate mapping data of the surface 120 from the digital images 134.

It should be noted that the surface 120 may represent any object. For example, when configured with an underwater mobile platform (e.g., an underwater drone, a submarine, or the like), the imaging system 100 may image a body of water's floor and generate image and/or mapping data of the floor. Alternatively or additionally, the imaging system may be used to image and/or map viscous flows in the water, such as oil plumes from underwater oil rigs and pipelines, and/or other material plumes emanating from the water's floor. As such, the surface may exist within a volume and is not limited to any types of materials within the volume.

In some embodiments, the imaging of the viscous flows may be used to calculate flow rates of the viscous flows. For example, the imaging system 100 may concentrate on imaging one area of a viscous object taking multiple snapshots of the viscous object. Then, based on the collection of images and the time between snapshots, the processor 138 may determine differences between the images over time to determine a flow rate of the viscous object. Such a process may be performed on any distributed material in any medium.

Any number of suitable wavelengths may be selected for the laser 102 as a matter of design choice. As mentioned, the laser 102 may be either a CW laser or a pulsed laser. CW lasers may have certain advantages, however, as they exist in a variety of relatively inexpensive and compact form factors. For example, diode lasers are plentiful and many are configured to be relatively small. Additionally, diode lasers consume much less power than their often complex pulsed counterparts. This may provide the advantage of longer scan times when scanning a surface, particularly in an unmanned mobile platform (e.g., a drone) with a limited power supply.

The optical element 104 may be implemented as one or more lenses, one or more diffractive element (e.g., a diffraction grating), one or more slit aperture optics, or combinations thereof. The imaging element 130 may be configured as one or more lenses, one or more filters, or combinations thereof. The detector 136 may be implemented in a variety of ways as a matter of design choice, including digital cameras, photodetectors, and the like. The processor 138 may also be configured in a variety of ways as a matter of design choice, including microprocessors, controllers, digital signal processors, imaging processors (e.g., graphics processing units or "GPUs"), and the like.

FIG. 2 is a flowchart of an exemplary process 200 for the imaging system 100 of FIG. 1. In this embodiment, the laser 102 diverges the laser light 108 to a surface 120, in the process element 202. The laser light 108 may be diverged to the surface 120 in any of a variety of ways as described above. The plane 110 of the laser light 108 (e.g., in which the optical axis 116 of the laser 102 lies) may intersect, at a nonorthogonal angle, the imaging plane 128 in which the imaging element 130 lies. In this regard, the imaging element 130 is configured in a bistatic arrangement with respect to the laser 102. And, the imaging element 130 images the laser light returns onto the detector plane 132, in the process element 204.

In some embodiments, the detector plane 132 also intersects the imaging plane 128 at a non-orthogonal angle. The detector 136 (e.g., a photodetector, a camera, or the like) generates one or more digital images 134 of the laser light returns 124, in the process element 206. Then, the processor 138 may generate mapping data of the surface 120 from the digital image 134 appearing in the detector plane 132, in the process element 208.

Figure 3:
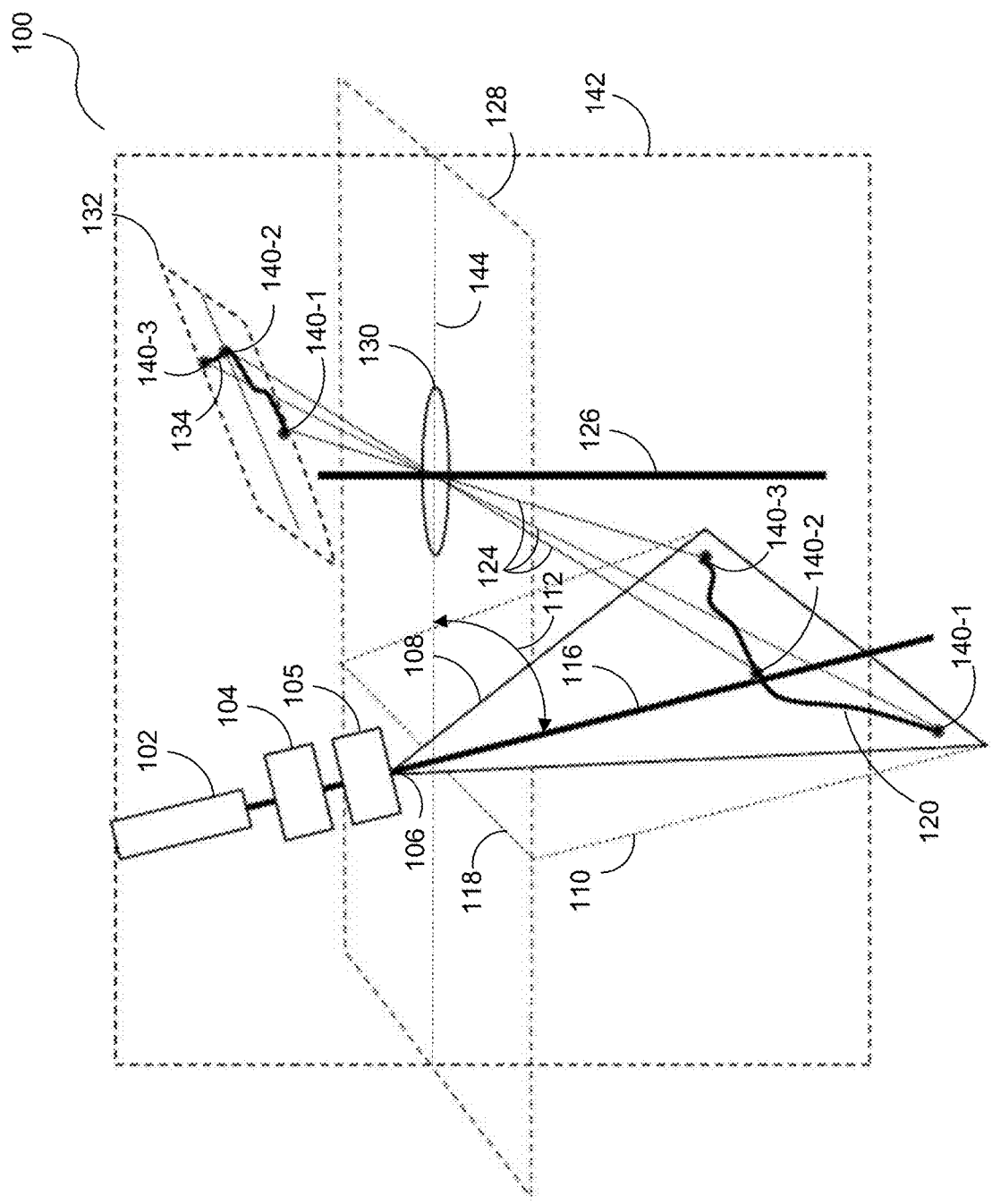
FIGS. 3-8 are block diagrams of exemplary imaging systems.

FIG. 3 is a block diagram of another exemplary laser imaging system 100. The imaging system 100, in this embodiment, includes a laser 102 that directs laser light towards the surface. In one embodiment, a relatively low cost and efficient GaN laser diode may be used as the laser 102. One or more optical elements 104 and 105 may be configured with the imaging system 100 that "fan" the laser light towards the surface. For example, the laser 102 is operable to generate and direct laser light along the optical axis 116 of the laser 102. A beam diverger, such as the optical element 105, may diverge or fan the laser light in a plane 110 such that the laser light radiates in a triangular like pattern from the focal point 106 to the surface. In some embodiments, the optical element 105 is a diffractive optical element that fans the laser light 108 as individual beamlets (e.g., Holoeye model DE-R 267). In other embodiments, the optical element 105 may include a Powell lens (e.g., Edmund Optics Model #46-364) or a combination of a diffractive optical element and a Powell lens. In yet another embodiment, multiple lasers may be used to fan the laser light 108, with each laser forming an independent beam.

As the laser light 108 impinges the surface 120, laser light 124 is backscattered to an imaging element 130 in the imaging plane 128. The imaging element 130 is oriented in a bistatic configuration with respect to the laser 102. For example, the imaging element 130 (e.g., a lens) is configured in the imaging plane 128 and has an optical axis 126 that is generally orthogonal to the imaging plane 128. Thus, the optical axis 126 lies in a plane 142 that is generally orthogonal to the imaging plane 128. The plane 142 intersects the imaging plane 128 through the intersection line 144 where the imaging element 130 is positioned. The optical axis 116 of the laser 102 (as well as the plane 110 where the laser light 108 is diverged) is configured to non-orthogonally intersect the imaging plane 128 at an angle 112. Thus, the laser 102 and the receiver portion of the imaging system 100 (e.g., the imaging element 130 and the detector plane 132) have separate apertures.

The imaging plane 128 may be oriented so that the laser light impinges the surface 120 at multiple continuous points 140 (e.g., points 140-1, 140-2, and 140-3) within the plane 110. The laser returns pass through imaging element 130 in the imaging plane 128 and are focused within plane 132. The laser returns 124 include the range variations between the optical element 104 and the surface 120. This design choice may permit in-focus imaging of the plane 110. However, other arrangements may be chosen for designs with relatively large bistatic distances and/or where near-range imaging is not required. When a bistatic design is chosen to maintain in-focus imaging of the laser light returns 124 resulting from the backscatter of the laser light 108 in the plane 110, the imaging plane 128 is generally not orthogonal to the optical axis 116.

Figure 4:
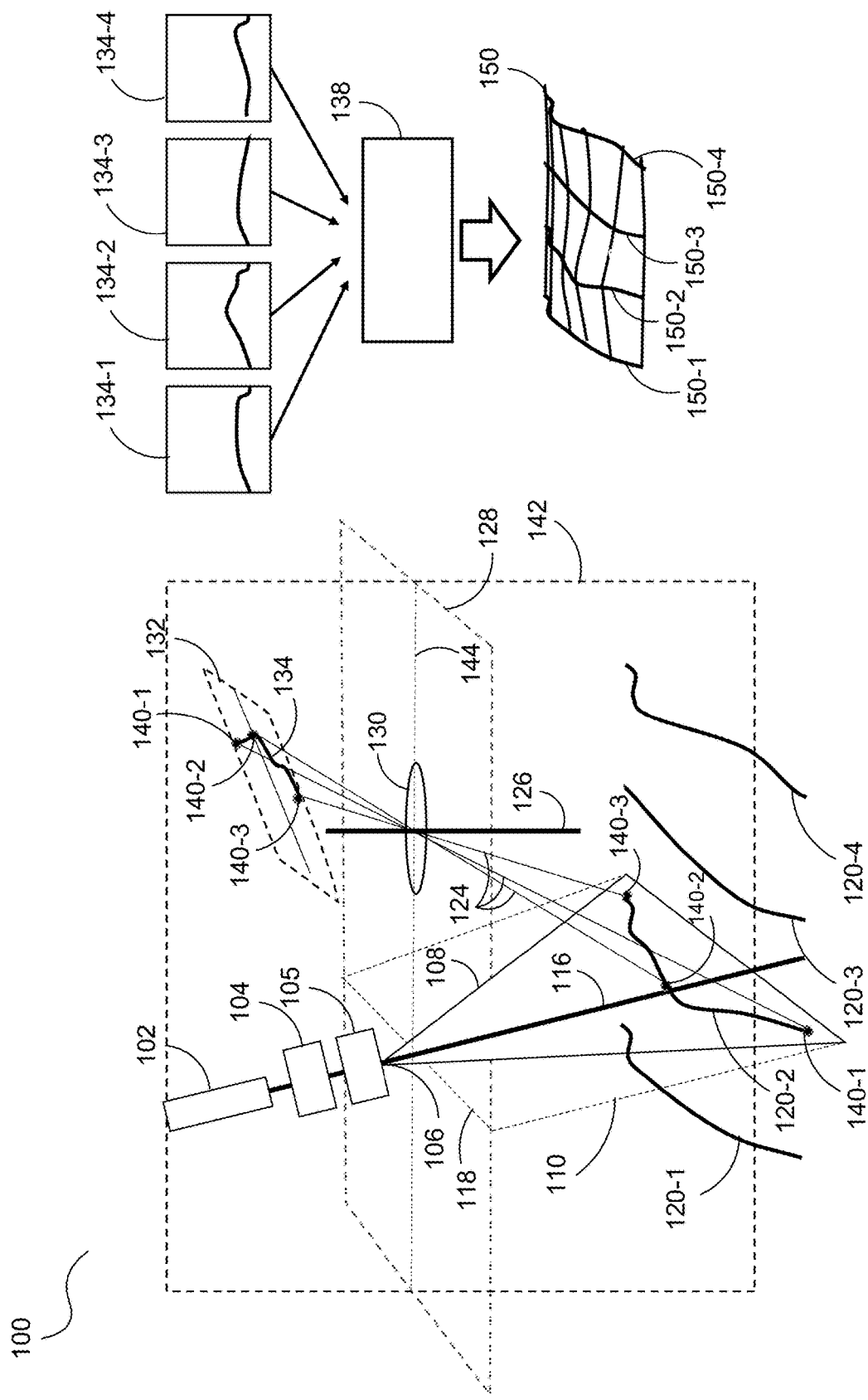

The imaging element 130 images the backscattered laser light 124 onto a detector plane 132. The detector plane 132 may be configured non-orthogonally to the optical axis 116 of imaging element 130. A detector (e.g., the detector 136 of FIG. 1) captures the image 134 of the backscattered light 124 in the detector plane 132. Thus, when the imaging system 100 moves across the surface 120, the detector can capture a plurality of 2D images 134 of the surface 120. In this embodiment, the movement of the imaging system 100 should generally have a component of motion that is orthogonal to the plane 110. FIG. 4 illustrates one such exemplary operation.

Turning to FIG. 4, assume that the imaging system 100 is configured with a mobile platform that is moving from left to right with respect to the page. As the imaging system 100 scans the surface 120, the imaging system 100 generates a first 2D image 134-1. Then, as the mobile platform moves right, the detector captures and generates the 2D image 134-2, then the 2D image 134-3, and so on. These images 134-1-134-4 may then be processed by the processor 138 to generate mapping data that can be used, for example, to generate a digital elevation map 150 of the surface 120. For example, the wire mesh line 150-1 may correspond to the image 134-1, the wire mesh line 150-2 may correspond to the image 134-2, and so on. The processor 138 may align the images 134-1-13-4 according to when the images were taken to generate the digital elevation map 150. Then the processor 138 may apply a smoothing algorithm to digitally recreate the surface 120.

While generally any detector may be used, a faster detector capture can improve resolution of the digital elevation map 150. For example, if the mobile platform is moving a relatively constant speed, a relatively fast camera may sample the surface 120 more often by capturing more images of the surface. The processor 138 can combine the 2D images and apply a smoothing function to digitally recreate the surface into the digital elevation map 150. If the platform is moving quickly so that the scene changes substantially between each image frame, a pulsed laser, synchronized with the camera, may be used to provide camera images without the smearing effects that may result from the motion of the imaging system 100.

A digital elevation map 150 of the surface 120 may include the range variations in the surface 120 with respect to the laser 102. In some embodiments and depending on the configuration, the imaging system 100 may be able to detect range variations as small as two centimeters or less and up to many meters.

Additionally, based on the intensity of laser radiation backscattered from the surface 120, the imaging system 100 can infer reflective contrast from the surface 120. For example, laser light 124 backscattered from the surface 120 to the detector (e.g., the detector 136 of FIG. 1) from the imaging element 130 can vary in intensity due to varying absorptions of the laser light 108 in the surface 120. These intensity variations can indicate contrast changes in the surface 120. And, based on the intensity changes in the backscattered laser light 124 with respect to the intensity of the laser light originating from the laser 102, the imaging system 100 can infer reflection changes in the surface 120. The processor 138 may also infer intensity changes in the surface 120 based on the signal intensity of the scattering of the laser light 124 from the surface 120. From there, the processor 138 can impose intensity contrast changes in the digital elevation map 150 based on the laser light backscattered from the surface 120. In this regard, the processor 138 may provide intensity mapping with the digital elevation map 150 that is representative of the surface 120.

The imaging system 100 may be configured with a variety of mobile platforms. For example, the imaging system 100 may be configured on a land vehicle to scan a scene and generate mapping and other useful data therefrom. The imaging system 100 has other advantageous uses where humans cannot as easily process such imagery. For example, the imaging system 100 may be configured with a submersible vehicle (e.g., a submarine, an unmanned submersible vehicle, a towed submersible vehicle, etc.) to scan and generate digital elevation map 150 of a surface, such as an ocean floor, a riverbed, a lake floor, or the like. The imaging system 100 also has particular advantages for operation in media with volumetric scattering, since the bistatic arrangement provides more low-cost options for managing different volumetric backscatter intensities from within the fan beam than monostatic sensor arrangements can provide.

Other advantages of the imaging system 100 may exist in the implementation of the laser 102. For example, the laser 102 and to may be implemented as a relatively low-power/inexpensive diode laser. Generally though, any low bandwidth modulated laser may be used. Thus, in an environment with power constraints (e.g., unmanned vehicles, unmanned submersibles, etc.), imaging missions can be extended because the laser does not consume as much power as more sophisticated lasers.

Figure 5:
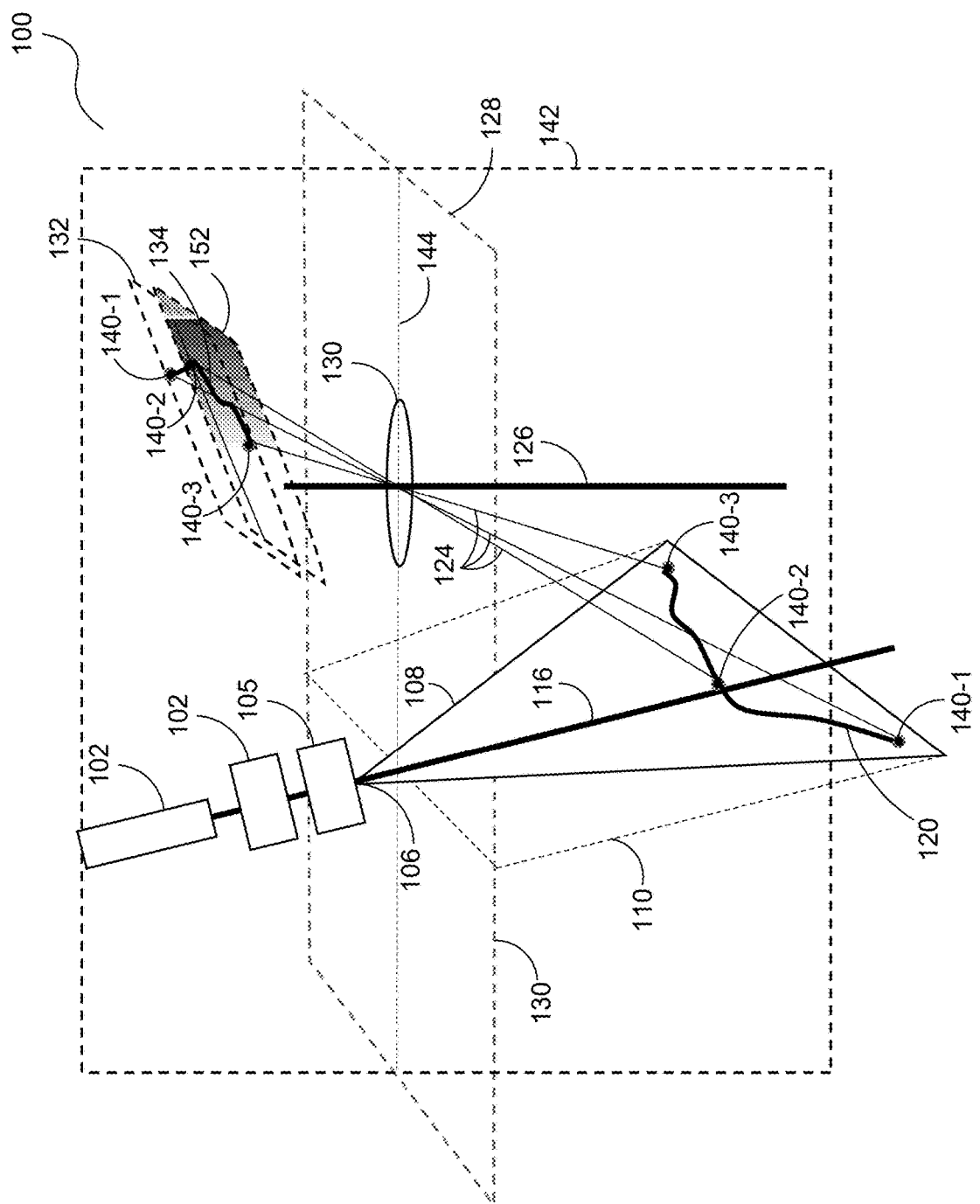

FIG. 5 illustrates the imaging system 100 of FIG. 3 configured with a filter 152. The filter 152 may be a spatial filter that is placed in front of the detector plane 132 to dynamically balance near range and far range returns. Generally, a spatial filter ensures that the intensity of near range returns do not saturate the detector, when the detector gain is set to observe lower intensity scatter from far range returns. This allows the imaging system 100 to provide a relatively large range of depth perception to the generated mapping data (e.g., from 2 centimeters or less to many meters).

In other embodiments, the filter 152 may include a spectral filter operable to transmit light within a specified wavelength band or bands. Alternatively or additionally, the filter 152 may include both a spatial filter and spectral filter, either as separate sub-components or integrated within a single optical element. In some embodiments, a spectral filter transmission band may be chosen to include the laser wavelength, while rejecting light at other wavelengths. However, for embodiments where nonlinear scattering is being measured (e.g., fluorescence, Raman scattering, Brillouin scattering, etc.), a spectral filter may be chosen to reject light at the wavelength of the laser 102 and pass or otherwise transmit scattered light at wavelengths associated with the nonlinear scattering process. These nonlinear scattering embodiments are particularly useful for volumetric measurements of nonlinear scattering analytes.

In some embodiments, the filter 152 may be a spectral filter operable to statically or dynamically filter wavelengths of the backscatter returns 124 to identify color of the backscattered light 124 and/or to identify a material composition of the surface 120 (e.g., from a nonlinear scattering process such as fluorescence or Brillouin or Raman scattering). For example, Semrock manufactures a tunable spectral bandpass filter (called VersaChrome™) that is designed provide a spectral band pass that shifts in wavelength as a function of mechanical tilt, which may be dynamically provided through a separate control system. In this regard, the processor 138 may provide color to the digital elevation map 150 (above) that may be representative of the surface 120.

Figure 6:
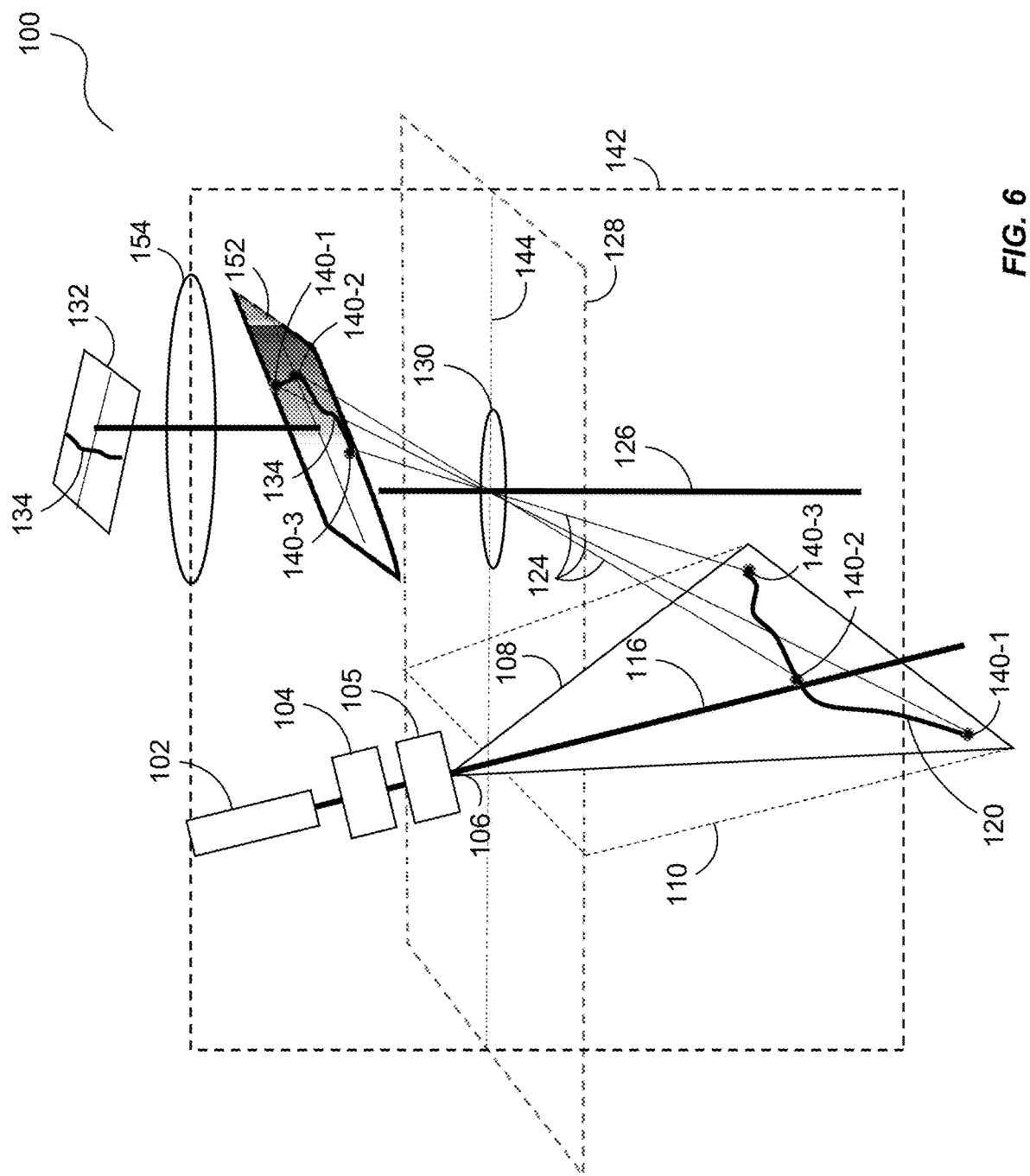

FIG. 6 illustrates the imaging system 100 capturing a 2D image 134. Again, as the imaging system 100 moves relative to a surface 120, the imaging system 100 may capture a plurality of images 134 and format them into mapping data of the surface 120 providing depth, intensity, and contrast of the surface 120 (e.g., and any objects lying thereupon). In this embodiment, the imaging system 100 includes a refocusing/reimaging lens 154 which permits a spatial filter 152 to be positioned at the imaging plane 128 of imaging element 130. The reimaging lens 154 operates to reimage light at the imaging plane 128 of the spatial filter 152 and the imaging element 130 to the detector plane 132. This reimaging arrangement permits greater flexibility in the design and placement of the spatial filter 152, especially if the spatial filter 152 is implemented as a dynamic spatial light modulator (e.g., a transmissive spatial light modulator by Meadowlark Optics, Inc.) in a physical housing that may prohibit close placement to the detector plane 132.

FIG. 7 illustrates the imaging system 100 employing a plurality of beamlets 108-1-108-N (wherein the reference "N" indicates an integer greater than 1and not necessarily equal to any other "N" reference designated herein). In this embodiment, the optical element 105 splits the beam from the laser 102 into the beamlets 108 in a fan pattern. The optical element 105 may be implemented, for example, as a diffractive optical element, one or more beam splitters, or a combination thereof. For example, from the focal point 106 on the optical element 105, laser light splits into the beamlets 108-1-108-N in a fan-like pattern in the plane 110, with each beamlet 108 propagating along a path from the focal point 106 at an acute angle with respect to a next closest beamlet 108. The beamlets 108 thus sample points of the surface 120 which are then backscattered (e.g., laser returns 124) and imaged by the imaging element 130 onto the detector plane 132 to produce a sampled image 134 (e.g., via the detector 136 of FIG. 1).

A smoothing function can then be used to recreate the surface 120 in the 2D image 134. For example, the points 140-1-140-N may represent locations where the beamlets 108-1-108-N impinge the surface 120. The beamlets 108-1-108-N backscatter laser light 124 to the imaging element 130 and ultimately to the detector plane 132. Instead of detecting a continuous line of backscattered laser light 124 as illustrated in the above embodiments, the detector 136 may image a series of points 140-1-140-N in the image that correspond to the points 140-1-140-N representing range variations in the surface 120. The processor 138 may then apply a smoothing function to the points 140-1-140-N in the image 134 to reconstruct the range variations in the surface 120. In other words, the smoothing function may "connect the dots" to form the range variations in the surface 120 that appear in the detector plane 132 when the image 134 is formed, as illustrated to the right of the imaging system 100. Again, as the imaging system 100 moves, multiple 2D images can be captured to generate the digital elevation map 150, shown above.

In some embodiments, the beamlets 108-1 to 108-N may be generated sequentially with the optical element 105 being implemented as an optical scanner, such as a rotating mirror. For example, the laser 102 may represent a single laser (either pulsed or CW). And, a rotating mirror may scan the beam along the points 140-1-140-N on the surface 120. The laser returns 124 would then be captured in the detector plane 132 as described above. In such an embodiment, the rotational speed of the mirror may determine the speed and sensitivity of the detector.

Alternatively, the laser 102 may represent a plurality of lasers with each generating a beam of laser light 108, fanned out in a similar manner as illustrated with the beamlets 108-1-108-N. Thus, each laser would sample the surface 120 as described above. A combination of approaches using multiple lasers, each with their own optical element 105 for generating a fan like pattern may also be a design choice for some embodiments.

FIG. 8 illustrates an embodiment that senses and images a volumetric object 145, such as an underwater oil leak. As the fanned-out laser light 108 propagates, portions of the light are backscattered from the object 145 to the imaging element 130 where the image 160 is captured by the detector (e.g., the detector 136 of FIG. 1). However, some portions of the laser light 108 may penetrate the object 145 and backscatter (124) to the imaging element 130 to be captured by the detector. This embodiment, therefore, may provide a depth of the object 140 as well. As the imaging system 100 moves, multiple images 160 (e.g., volumetric slices) of the object 145 may be captured as described above such that a volumetric mapping of the object 145 may be formed to generate the volumetric image 160 (e.g., a 3D image).

To illustrate, the imaging system 100 fans laser light 108 to the object 145. Some of the laser light 108 backscatters from the surface of the object 145. But some of the laser light 108 may penetrate the object 145 such as the case with distributed materials within a medium (e.g., oil in water, dust or gas in air, etc.). Thus, as the imaging system 100 moves along the object 145, the imaging system 100 may produce volumetric snapshots 160-1-160-4. From there, the processor 138 may arrange the snapshots 160-1-160-4 in the order they were taken to form a volumetric image 160 of the object 145 (e.g., a 3D image of the object 145).

In some embodiments, the imaging system 100 may also be configured to measure certain dynamically changing features of the object 145. For example, by measuring the dynamics of a "plume" (e.g., an underwater oil leak, a distributed material, a natural leakage from the ocean floor, etc.), the total volume of an analyte that is being measured can be estimated or determined. Alternatively or additionally, based on plume size and density gradients, estimates of rates can be made. In addition to those just mentioned, this sort of sensing could be used for any of a variety of forms of analytes, such as gases, dissolved or otherwise.

FIG. 9 is a block diagram of an exemplary imaging system 100 configured with a mobile platform 250. The imaging system 100 includes the laser 102 which is operable to diverge laser light 108 in a substantial plane through a medium 260 to a surface 120. When the laser light 108 impinges the surface 120 (e.g., the portion of the surface 120 being interrogated), the surface 120 backscatters the light towards the receiver 252 (as well as a variety of other directions) through any of a variety of backscatter and processes described hereinabove. The receiver 252 (e.g., the imaging element 130 and the detector 136, among other components) captures an image 134 of that portion of the surface. Then, as the mobile platform 250 moves (as indicated by the arrow), the receiver 252 captures another image 134 from the backscattered laser light 124 resulting from the laser 102 interrogating another portion of the surface 120.

Examples of the medium 260 include any medium suitable for propagating laser light 108, including air, water, and various gases. Examples of the surface 120 being interrogated again include ocean floors, river bottoms, objects, Earth surfaces, viscous flows, and the like. Accordingly, the mobile platform 250 may be representative of a submersible vehicle, an airborne vehicle, a ground vehicle, a space vehicle, and the like. Any embodiment of the imaging system 100, or combination of embodiments, disclosed herein may be configured with the mobile platform 250 as a matter of design choice.

Figure 10:
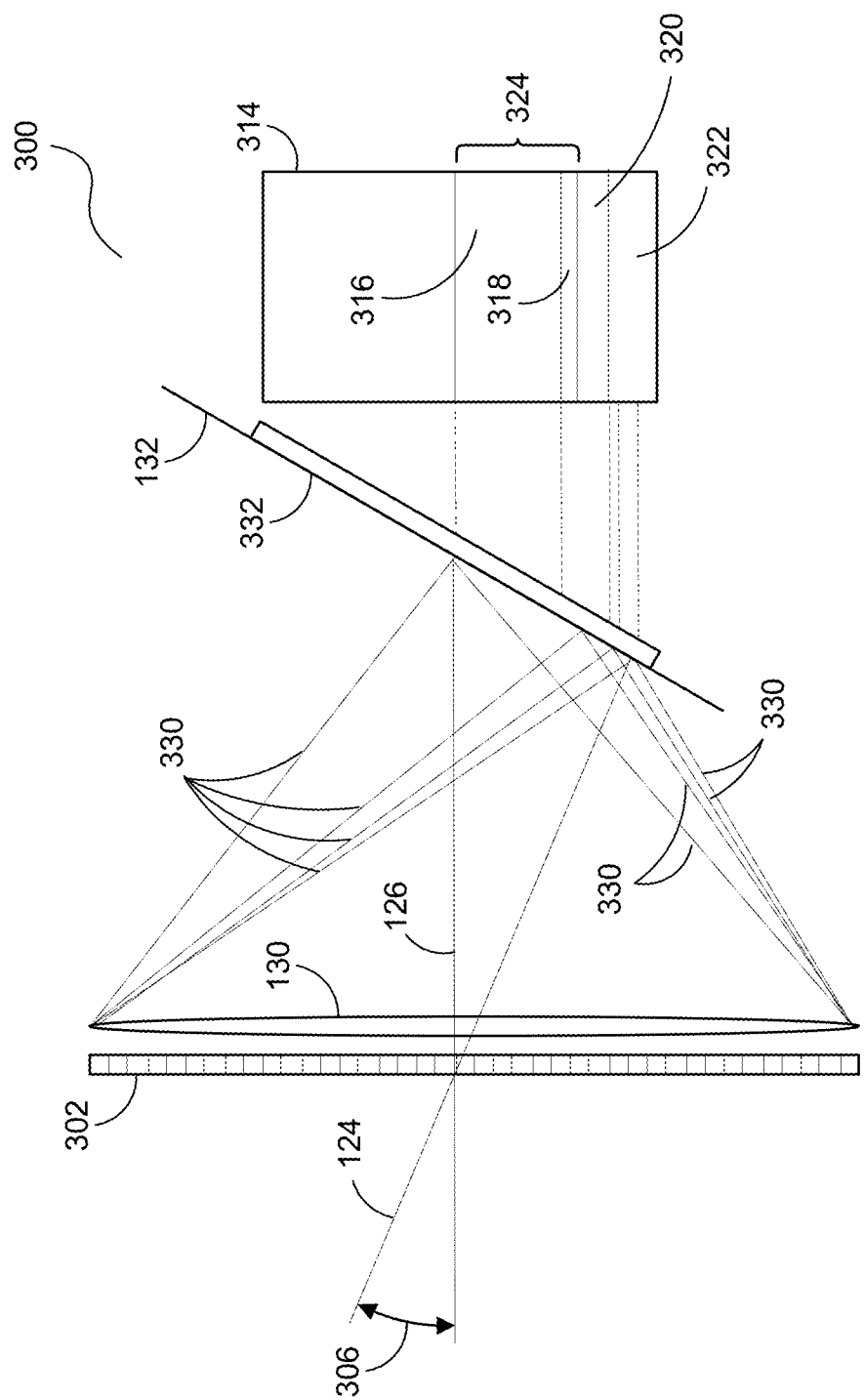
FIG. 10 is a block diagram of an exemplary sensing imaging channel that detects various forms of backscattering and fluorescence.

FIG. 10, in another embodiment, illustrates a sensing imaging channel 300 that may be configured to permit fluorescence analysis of an interrogated surface (e.g., surface 120 of FIG. 1). For example, when a laser fan beam, such as laser light 108 of FIG. 1, is incident on the interrogated surface, the backscattered light 124 may enter the imaging plane 128 an angle 306 with respect to the optical axis 126 of the imaging element 130 and include the reflected light (e.g., the laser returns 124 of FIG. 1) at the wavelength of the laser (e.g., laser 102 of FIG. 1). But, this backscattered light 124 may also include light that is emitted at a fluorescence spectrum associated with the material composition of the surface. Generally, this fluorescence light has longer wavelengths than the laser wavelength.

A spectral dispersion element 302, such as a transmission grating, may be used to separate fluorescent wavelengths from the laser wavelengths at a detector (e.g., the detector 136 of FIG. 1) positioned in the detector plane 132, so that the spatially dependent fluorescent spectrum of the surface may be calculated and associated with locations on the digital image computed at the detector plane (e.g., via ray lines 330).

In such an embodiment, this spectral analysis capability may be added by inserting an appropriately selected transmission grating in front of the imaging element 130 (e.g., before the backscattered light and/or fluorescence reaches the imaging element 130). For example, consider an imaging element 130 having a 16 mm focal length and a camera with 5 μm pixels with a field of view of about 35 degrees in air. With reasonable design considerations, a transmission grating with 100 lp/mm may result in diffracted image orders 316, 318, 320, 322, and 324 that are separated by about 150 pixels for a 450 nm wavelength (e.g., where diffraction order 316 represents the first order of the laser wavelength, 318 represents the first order of fluorescence, 324 represents the first order of diffraction, and 320 and 322 represent the $0^{th}$ image orders).

Such a transmission grating may be chosen to have a diffraction "blaze angle" to select the first order diffraction 324 while suppressing other diffraction terms (e.g., 320 and 322). For example, the spectral dispersion element 302 may have a constant line spacing that determines the magnitude of the wavelength splitting caused by the grating. The grating lines generally have triangular, sawtooth-shaped cross sections, appearing as "steps". The steps are tilted at a blaze angle with respect to the grating surface. The blaze angle may be optimized to maximize efficiency for the wavelength of the used light and thus configured to pass light of the first order diffraction 324.

The spectral distribution 314 along the detector plane 132 may have a calculable spectral distribution 314 at the detector plane 132 that depends on the range to the surface. A spectral resolution after calibration and computation, of about 10 nm, can thus be readily obtained Since the reflectance image at the laser wavelength is generally much stronger than the fluorescence spectra, some embodiments may include a separate detector for spectral analysis. In such an embodiment, a spectral filter 320 may be used to block the laser wavelength and pass the fluorescence spectrum. A separate detector for detecting the laser light, without a spectral dispersion element may be used to provide dynamic calibration data to the spectral analysis channel.

By including a transmissive diffraction grating, blazed for high first-order efficiency within the sensing imaging channel 300, an emission spectrum (e.g., spectral distribution 314) can be collected within the same detector plane 132 as the primary image ($0^{th}$ order image 322). The first order diffraction 324 may result in duplicate images with displacements that are a function of the emission wavelength. The $0^{th}$ order image 322 is generally the same as the standard ranging image made without a grating. Additional line images from each fluorescence emission wavelength may be present in the image allowing discrimination between various fluorescent pigments at the interrogated surface.

Figure 11:
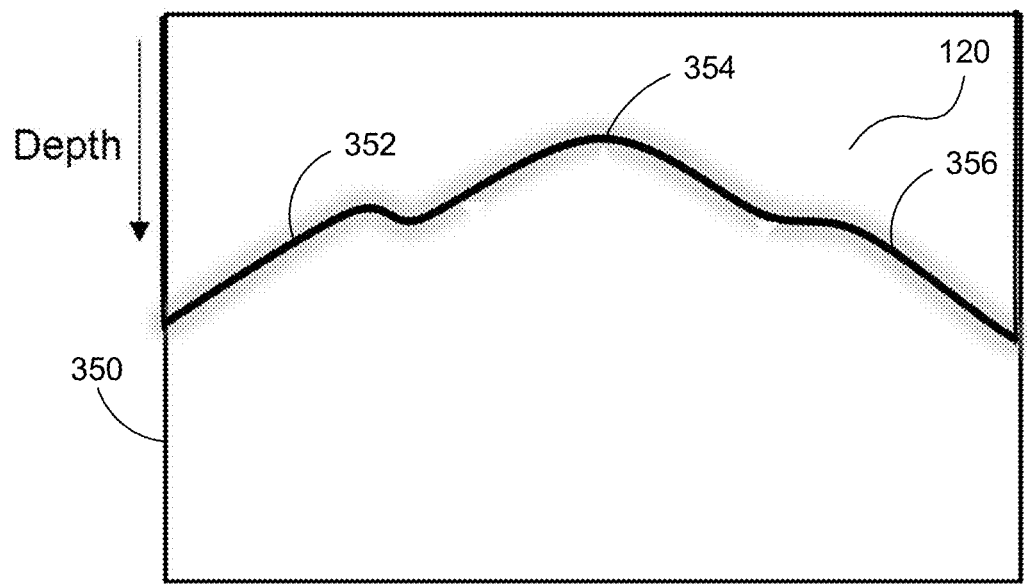
FIG. 11 is an exemplary image illustrating depth variations of a surface.
Figure 12:
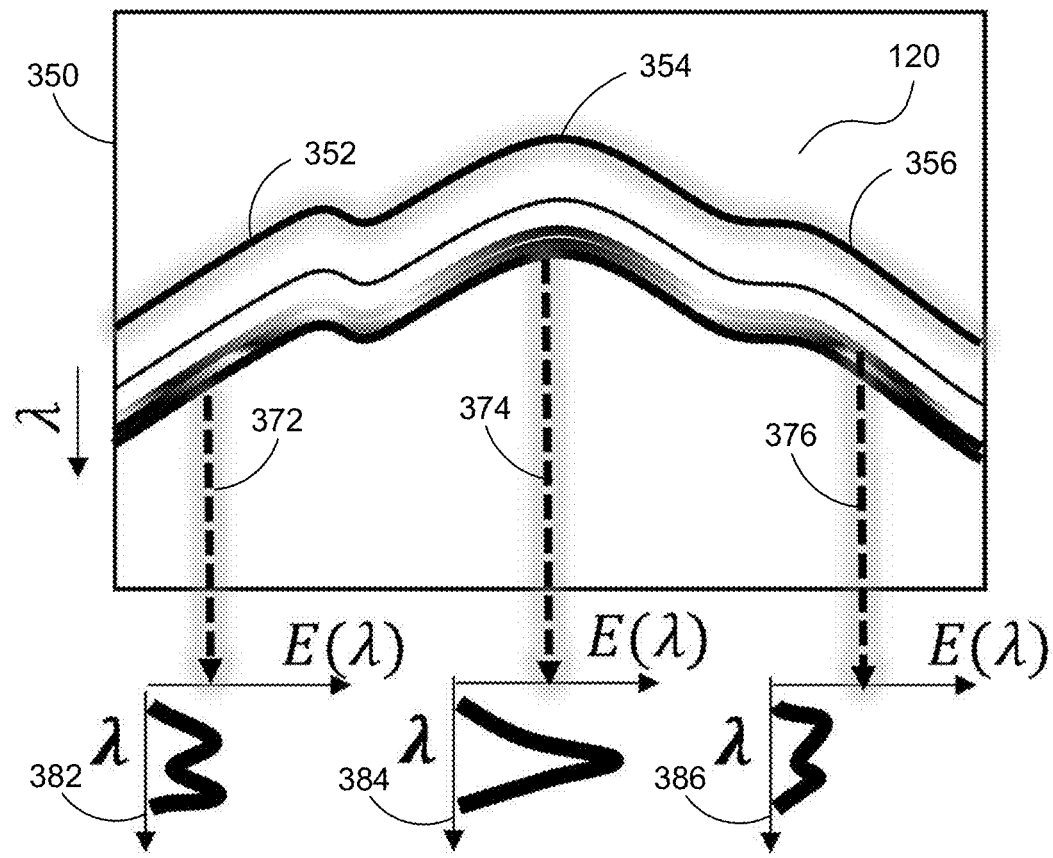
FIG. 12 is an exemplary image illustrating various wavelengths associated with the surface of FIG. 11.

A diagram of a resulting image 350 of a surface 120 is shown in FIG. 11. In this image 350, the surface has depth variations 352, 354, and 356 that are detected by the backscattered light (e.g., backscattered light 124 of FIG. 1) as illustrated in the above embodiments. As fluorescence from the surface 120 may be included in the backscattered light, the sensing imaging channel 300 detect this fluorescence and associate it with the depth variations 352, 354, and 356 of the surface 120 to produce color in the image 350 of the surface 120, where columns of pixels 372, 374, 376 are treated as individual spectrums, as illustrated in FIG. 12. As can be seen in this example, the individual spectrums 382, 384, and 386 are associated with their respective depth variations 352, 354, and 356, thus providing color to the image 350.

In some embodiments, spectral measurements may employ a separate detector from the detector used to measure range (e.g., the detector 136 of FIG. 1). Again, for spectral analysis, the backscatter laser light may be substantially brighter than the fluorescence in the first order diffraction. Thus, a laser line blocking filter may be used to sufficiently suppress signals from the laser wavelength so spectral information can be observed. The performance of the ranging camera may also be improved by using a spectral filter to block broad bandwidth solar radiation. The non-diffracted pixel to range mapping calculated for both the ranging and spectral analysis detectors may be used for the spatial mapping of the spectra measured by the spectral analysis detector. And, certain deconvolution algorithms may be used to extract volumetric (e.g., water column) spectral information.

While the preceding embodiment was described with respect fluorescence analysis, such spectral analysis may also be advantageously used analyze spectra from other laser backscatter phenomena, including Raman processes, in which a laser wavelength results in backscattering at wavelengths different than the laser wavelength. Accordingly, the sensing imaging channel 300 may be used in any of the embodiment disclosed herein to provide analysis to any of a variety of backscatter and fluorescence observations.

Figure 13:
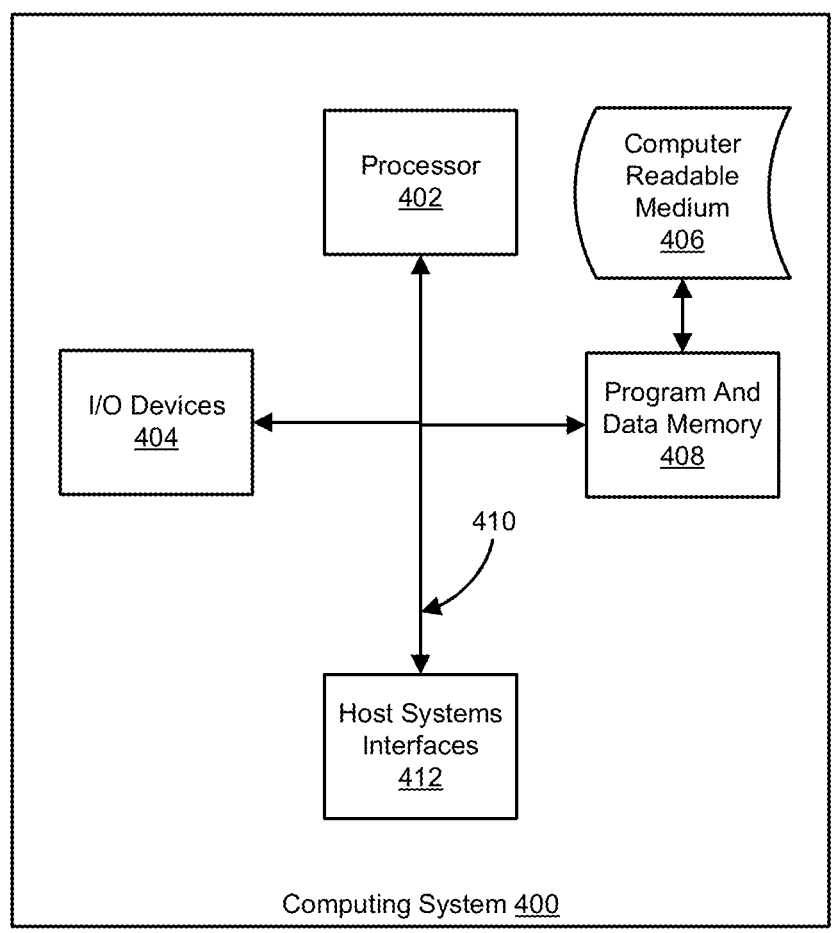
FIG. 13 is a block diagram of an exemplary computing system in which a computer readable medium provides instructions for performing methods herein.

The embodiments herein may be combined in a variety of ways as a matter of design choice. Accordingly, the features and aspects herein are not intended to be limited to any particular embodiment. Furthermore, the embodiments can take the form of hardware, firmware, software, and combinations thereof. For example, optical components such as lenses are generally preconfigured "hard" components. However, other optical devices, including lenses may be electronically controlled. In this regard, certain embodiments herein may employ various combinations of hardware and software. In one embodiment, such software includes but is not limited to firmware, resident software, microcode, etc. FIG. 13 illustrates a computing system 400 in which a computer readable medium 406 may provide instructions for performing any of the methods and processes disclosed herein.

Furthermore, some aspects of the embodiments herein can take the form of a computer program product accessible from the computer readable medium 406 to provide program code for use by or in connection with a computer or any instruction execution system. For the purposes of this description, the computer readable medium 406 can be any apparatus that can tangibly store the program code for use by or in connection with the instruction execution system, apparatus, or device, including the computing system 400.

The computer readable medium 406 can be any tangible electronic, magnetic, optical, electromagnetic, infrared, or semiconductor system (or apparatus or device). Some examples of a computer readable medium 406 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 400 can include one or more processors 402 coupled directly or indirectly to memory 408 through a system bus 410. The memory 408 can include local memory employed during actual execution of the program code, bulk storage, and/or cache memories, which provide temporary storage of at least some of the program code in order to reduce the number of times the code is retrieved from bulk storage during execution.

Input/output (I/O) devices 404 (including but not limited to keyboards, displays, pointing devices, I/O interfaces, etc.) can be coupled to the computing system 400 either directly or through intervening I/O controllers. Network adapters may also be coupled to the computing system 400 to enable the computing system 400 to couple to other data processing systems, such as through host systems interfaces 412, printers, and/or or storage devices through intervening private or public networks. Modems, cable modems, and Ethernet cards are just a examples of network adapter types.

What is claimed is:

1. An imaging system, comprising:
a laser operable to diverge laser light into a fan beam in a first plane and to a surface;
an imaging element configured in a bistatic arrangement with respect to the laser, the imaging element being operable to image the laser light returned from the surface;
a detector in optical communication with the imaging element to generate a digital image of the returned laser light, wherein the imaging element is configured to provide continuous in-focus imaging of the first plane of the diverged laser light to the detector; and a processor operable to generate mapping data of the surface from the digital image.

2. The imaging system of claim 1, wherein:
the laser is a continuous wave (CW) laser.

3. The imaging system of claim 1, wherein:
the processor is further operable to provide an intensity mapping of the surface.

4. The imaging system of claim 1, further comprising:
an optical element in optical communication with the laser and operable to diverge the laser light from the laser to the surface.

5. The imaging system of claim 4, wherein:
the optical element comprises a lens that diverges the laser light; and
a slit aperture optic that propagates the diverged laser light substantially in the first plane.

6. The imaging system of claim 4, wherein:
the optical element comprises one or more beam splitters that split a beam of the laser light from the laser into a plurality of beamlets within the fan beam.

7. The imaging system of claim 1, wherein:
the laser comprises a plurality of lasers; and
each laser is operable to generate a beamlet at an acute angle with respect to a next closest beamlet.

8. The imaging system of claim 1, wherein:
the laser has a first optical axis lying in the first plane; and
the imaging element lies in a tilted imaging plane that nonorthogonally intersects the first plane.

9. The imaging system of claim 1, further comprising:
a mobile platform operable to move the imaging system along the surface,
wherein the imaging system is operable to generate a plurality of digital images while the mobile platform is moving along the surface.

10. The imaging system of claim 9, wherein:
the mobile platform is a submersible vehicle; and
the surface is under water.

11. The imaging system of claim 1, wherein:
the processor is operable to detect intensity variations in the returned laser light, and to provide contrast to the mapping data based on the intensity variations.

12. The imaging system of claim 1, further comprising:
a spectral filter in optical communication with the imaging element and operable to filter wavelengths of the returned laser light outside of the laser light wavelength resulting from a backscattering process.

13. The imaging system of claim 12, wherein:
the processor is further operable to determine a material of the surface based on the backscattering process.

14. The imaging system of claim 12, wherein:
the backscattering process comprises at least one of: Mie scattering; Raleigh scattering; nonlinear scattering; parametric processes; Raman scattering; fluorescence; laser induced breakdown; or a combination thereof.

15. The imaging system of claim 1, wherein:
the processor is further operable to generate a volumetric image of a volumetric scatterer based on the returned laser light.

16. The imaging system of claim 15, wherein:
the processor is further operable to determine a flow rate of the volumetric scatterer.

17. The imaging system of claim 15, wherein:
the volumetric scatterer comprises at least one of: an oil leak from a pipeline; a material plume from the surface; or a distributed material.

18. A method, comprising:
diverging laser light into a fan beam in a first plane and to a surface;
imaging the laser light returned from the surface with an imaging element configured in a bistatic arrangement with respect to the laser;
detecting the returned laser light with a detector, wherein the imaging element is configured to provide continuous in-focus imaging of the first plane of the diverged laser light to the detector;
generating a digital image of the returned laser light; and
generating mapping data of the surface from the digital image.

19. A non-transitory computer readable medium comprising instructions that, when executed by a processor, are operable to direct the processor to:
control a laser that diverges laser light into a fan beam in a first plane and to a surface;
process the laser light returned from the surface, the light being imaged with an imaging element configured in a bistatic arrangement with respect to the laser, and being detected by a detector, wherein the imaging element is configured to provide continuous in-focus imaging of the first plane of the diverged laser light to the detector;
generate a digital image of the returned laser light; and
generate mapping data of the surface from the digital image.

* * * * *